United States Patent
Naguib et al.

(10) Patent No.: US 8,077,596 B2
(45) Date of Patent: Dec. 13, 2011

(54) SIGNALING TRANSMISSION AND RECEPTION IN WIRELESS COMMUNICATION SYSTEMS

(75) Inventors: Ayman Fawzy Naguib, Cupertino, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 763 days.

(21) Appl. No.: 12/043,796

(22) Filed: Mar. 6, 2008

(65) Prior Publication Data

US 2008/0227481 A1 Sep. 18, 2008

Related U.S. Application Data

(60) Provisional application No. 60/894,379, filed on Mar. 12, 2007.

(51) Int. Cl.
*H04W 4/00* (2009.01)
*H04J 11/00* (2006.01)
(52) U.S. Cl. .................. 370/208; 370/203; 370/328
(58) Field of Classification Search .......... 455/70, 455/17, 23, 517, 509, 515, 450, 524; 370/208, 370/328, 342, 329, 203
See application file for complete search history.

(56) References Cited

U.S. PATENT DOCUMENTS

| | | | | |
|---|---|---|---|---|
| 7,573,806 | B2 * | 8/2009 | Ihm et al. | 370/208 |
| 7,586,834 | B2 * | 9/2009 | Byun et al. | 370/208 |
| 7,613,244 | B2 * | 11/2009 | Hwang et al. | 375/260 |
| 7,724,722 | B2 * | 5/2010 | Seo et al. | 370/344 |
| 7,768,903 | B2 * | 8/2010 | Ihm et al. | 370/208 |
| 7,782,966 | B2 * | 8/2010 | Lee et al. | 375/260 |
| 7,995,615 | B2 * | 8/2011 | Yang et al. | 370/479 |
| 2003/0081690 | A1 | 5/2003 | Kim et al. | |
| 2007/0070967 | A1 * | 3/2007 | Yang et al. | 370/342 |
| 2010/0103886 | A1 * | 4/2010 | Chun et al. | 370/329 |

FOREIGN PATENT DOCUMENTS

WO WO2006062297 A2 6/2006

OTHER PUBLICATIONS

IEEE STD 802.16: "Part 16: Air Interface for Fixed and Mobile Broadband Wireless Access Systems", Oct. 1, 2004, XP002500848 New York, NY, USA cited in the application p. 268 p. 539-p. 542 p. 545 p. 569-p. 573.
IEEE Std. 802.16E-2005 and IEEE STD 802.16-2004/Cor1-2005: "Part 16: Air Interface for fixed and Mobile Broadband Wireless Access Systems Amendment 2: Physical and Medium Access Control Layers for Combined Fixed and Mobile Operation in Licensed Bands and Corrigendum 1", Feb. 28, 2006, XP002500847, New York, NY, USA.
International Search Report and Written Opinion—PCT/US2008/056486, International Search Authority—European Patent Office—Mar. 11, 2008.

* cited by examiner

*Primary Examiner* — Sonny Trinh
(74) *Attorney, Agent, or Firm* — D. Scott Juneau

(57) ABSTRACT

Techniques for sending and receiving signaling in a wireless communication system are described. Multiple (e.g., eight) vectors of modulation symbols may be defined and may be orthogonal to one another. Multiple subscriber stations may share transmission resources and may simultaneously send different vectors of modulation symbols in the same tile. Each subscriber station may be assigned multiple sets of at least one vector of modulation symbols usable by that subscriber station to convey signaling, e.g., one set of three vectors for acknowledgement (ACK) and another set of three vectors for negative acknowledgement (NAK). Each subscriber station may send one set of at least one vector in at least one tile to convey a signaling value. Different subscriber stations may simultaneously send different sets of at least one vector in the at least one tile to convey their signaling values.

40 Claims, 7 Drawing Sheets

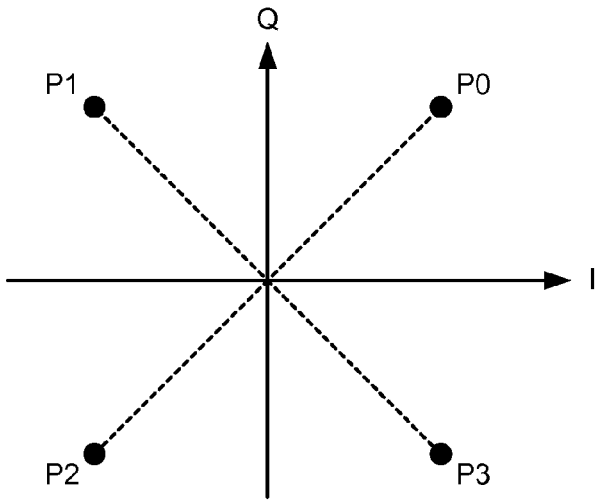
FIG. 5
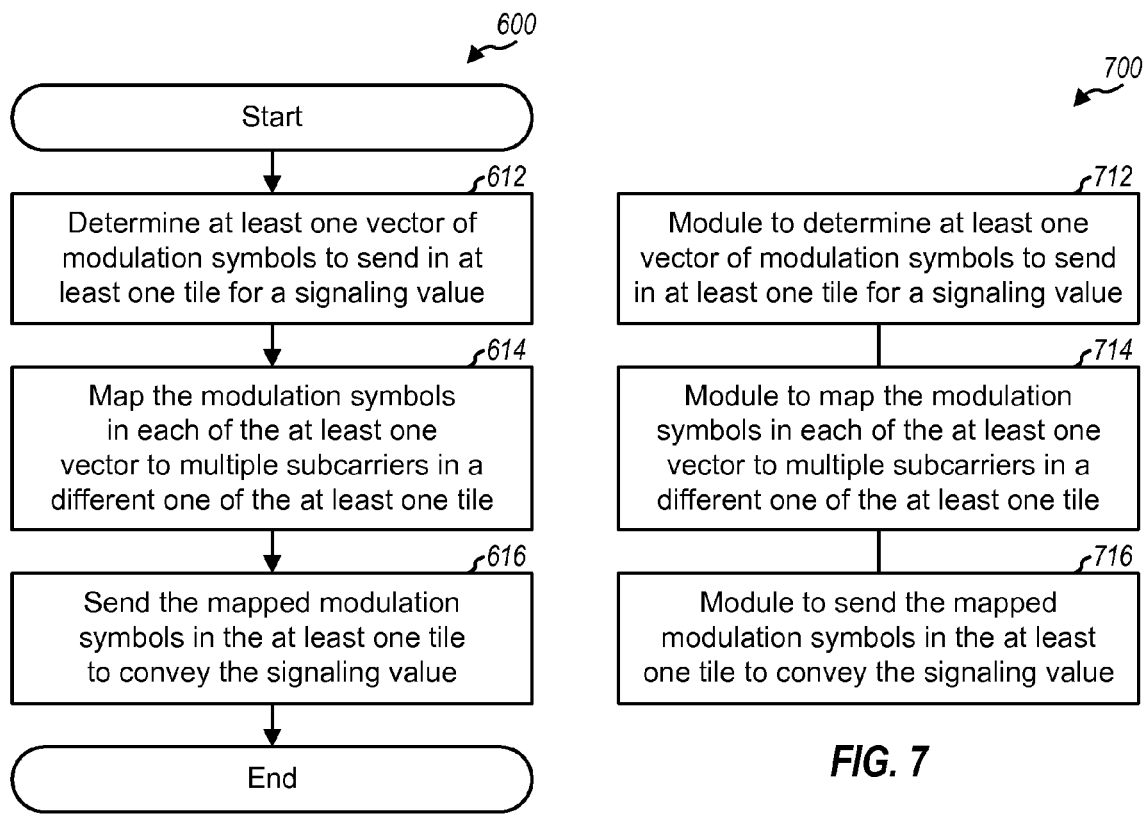
FIG. 6
FIG. 7

SIGNALING TRANSMISSION AND RECEPTION IN WIRELESS COMMUNICATION SYSTEMS

The present application claims priority to provisional U.S. Application Ser. No. 60/894,379, entitled "ACKNOWLEDGEMENT TRANSMISSION AND RECEPTION IN WIRELESS COMMUNICATION SYSTEMS," filed Mar. 12, 2007, assigned to the assignee hereof and incorporated herein by reference.

BACKGROUND

I. Field

The present disclosure relates generally to communication, and more specifically to techniques for sending and receiving signaling in wireless communication systems.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include any number of base stations that can support communication for any number of subscriber stations. A subscriber station may communicate with a base station via the downlink and uplink. The downlink (or forward link) refers to the communication link from the base station to the subscriber station, and the uplink (or reverse link) refers to the communication link from the subscriber station to the base station.

The system may support hybrid automatic retransmission (HARQ). For data transmission on the downlink with HARQ, a base station may send a transmission for a packet to a subscriber station. The subscriber station may decode the packet based on the transmission and may send an acknowledgement (ACK) if the packet is decoded correctly or a negative acknowledgement (NAK) if the packet is decoded in error. The base station may send another transmission for the packet if a NAK is received and may terminate transmission of the packet if an ACK is received. The ACK/NAK feedback is useful but consumes resources on the uplink. It is thus desirable to send ACK/NAK feedback as efficiently as possible.

SUMMARY

Techniques for sending and receiving signaling (e.g., ACK/NAK) in a wireless communication system are described herein. In one design, multiple (e.g., eight) vectors of modulation symbols may be defined and may be orthogonal to one another. The modulation symbols in a vector may be sent on multiple subcarriers in one tile.

In an aspect, multiple subscriber stations may share transmission resources and may simultaneously send different vectors of modulation symbols in the same tile. Each subscriber station may be assigned multiple sets of at least one vector of modulation symbols usable by that subscriber station to convey signaling. Each subscriber station may send one set of at least one vector in at least one tile to convey a signaling value. Different subscriber stations may simultaneously send different sets of at least one vector in the at least one tile to convey their signaling values.

In one design, a subscriber station may determine at least one vector (e.g., three vectors) of modulation symbols to send in at least one tile (e.g., three tiles) for a signaling value (e.g., an ACK or a NAK). The subscriber station may map the modulation symbols in each vector to multiple subcarriers in a different tile. The subscriber station may send the mapped modulation symbols in the at least one tile to convey the signaling value. In one design, the subscriber station may determine a first set of three vectors usable by the subscriber station for ACK and a second set of three vectors usable by the subscriber station for NAK. The subscriber station may send the first vector set if the signaling value comprises an ACK and may send the second vector set if the signaling value comprises a NAK.

In one design, a base station may obtain at least one vector (e.g., three vectors) of received symbols from at least one tile (e.g., three tiles). The base station may process the at least one vector of received symbols to determine a set of at least one vector of modulation symbols sent by each of multiple subscriber stations in the at least one tile. The base station may then determine a signaling value sent by each subscriber station based on the set of at least one vector determined to have been sent by that subscriber station. In one design, for each subscriber station, the base station may correlate three vectors of received symbols with three vectors of modulation symbols usable by that subscriber station for ACK to obtain a first value. The base station may also correlate the three vectors of received symbols with three vectors of modulation symbols usable by the subscriber station for NAK to obtain a second value. The base station may then determine whether an ACK or a NAK was sent by the subscriber station based on the first and second values.

Various aspects and features of the disclosure are described in further detail below.

BRIEF DESCRIPTION OF THE DRAWINGS

FIG. 5 shows a signal constellation for QPSK.

FIG. 6 shows a process for sending signaling by a subscriber station.

FIG. 7 shows an apparatus for sending signaling.

DETAILED DESCRIPTION

The techniques described herein may be used for various wireless communication systems such as CDMA, TDMA, FDMA, OFDMA and SC-FDMA systems. The terms "system" and "network" are often used interchangeably. A CDMA system may implement a radio technology such as cdma2000, Universal Terrestrial Radio Access (UTRA), etc. An OFDMA system may implement a radio technology such as Ultra Mobile Broadband (UMB), Evolved UTRA (E-UTRA), IEEE 802.11 (which is also referred to as Wi-Fi), IEEE 802.16 (which is also referred to as WiMAX), IEEE 802.20, Flash-OFDM®, etc. These various radio technologies and standards are known in the art.

For clarity, various aspects of the techniques are described below for WiMAX, which is covered in IEEE 802.16, entitled "Part 16: Air Interface for Fixed and Mobile Broadband Wireless Access Systems," dated Oct. 1, 2004, and in IEEE 802.16e, entitled "Part 16: Air Interface for Fixed and Mobile Broadband Wireless Access Systems Amendment 2: Physical and Medium Access Control Layers for Combined Fixed and Mobile Operation in Licensed Bands," dated Feb. 28, 2006. These documents are publicly available. The techniques may also be used for IEEE 802.16m, which is a new air interface being developed for WiMAX.

Figure 1:
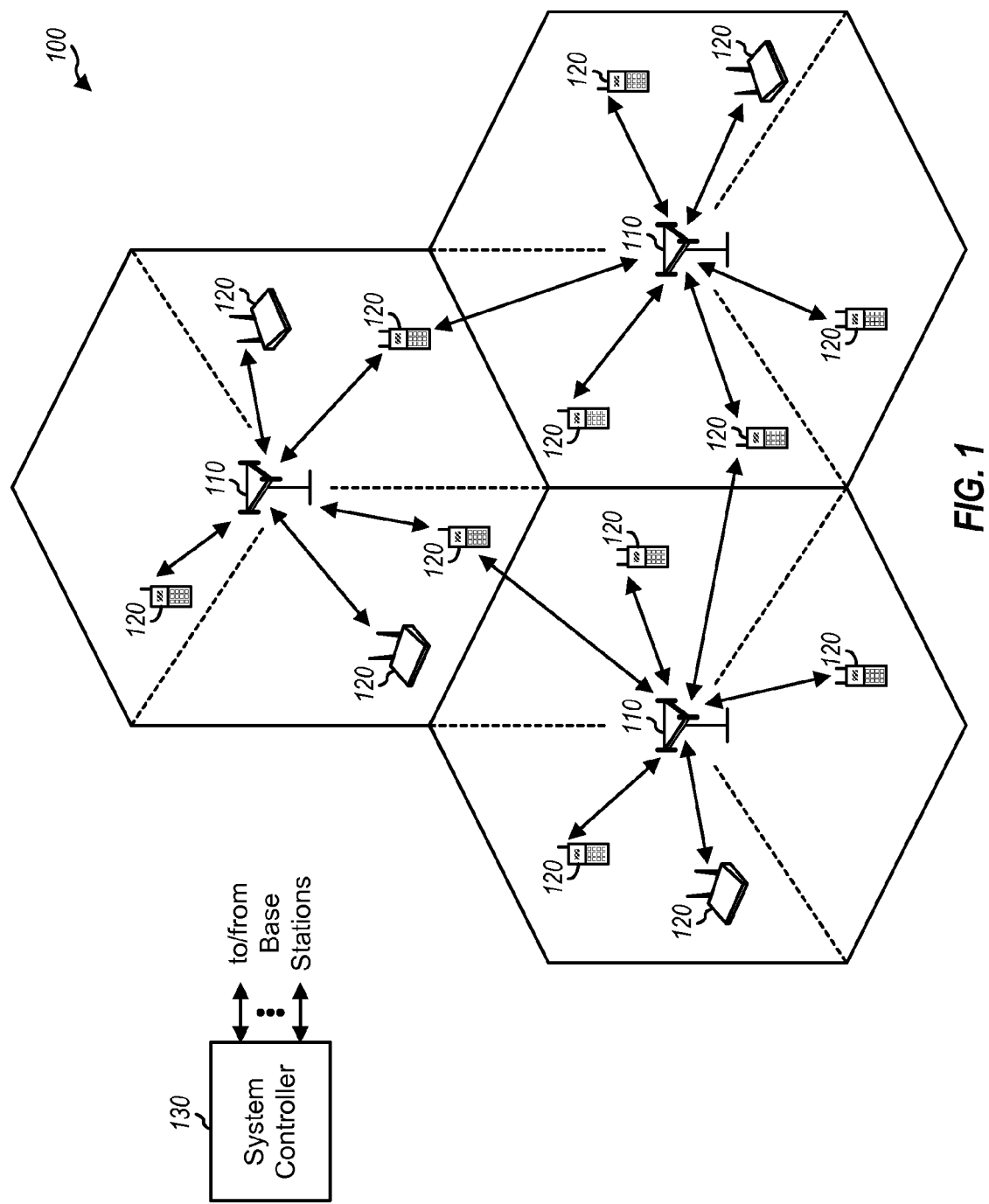
FIG. 1 shows a wireless communication system.

FIG. 1 shows a wireless communication system 100 with multiple base stations (BS) 110 and multiple subscriber station (SS) 120. A base station is a station that supports communication for subscriber stations and may perform functions such as connectivity, management, and control of subscriber stations. A base station may also be referred to as a Node B, an evolved Node B, an access point, etc. A system controller 130 may couple to base stations 110 and provide coordination and control for these base stations.

Subscriber stations 120 may be dispersed throughout the system, and each subscriber station may be stationary or mobile. A subscriber station may also be referred to as a mobile station, a terminal, an access terminal, a user equipment, a subscriber unit, a station, etc. A subscriber station may be a cellular phone, a personal digital assistant (PDA), a wireless device, a wireless modem, a handheld device, a laptop computer, a cordless phone, etc. The terms "subscriber station" and "user" are used interchangeably herein.

IEEE 802.16 utilizes orthogonal frequency division multiplexing (OFDM) for the downlink and uplink. OFDM partitions the system bandwidth into multiple (NFFT) orthogonal subcarriers, which may also be referred to as tones, bins, etc. Each subcarrier may be modulated with data or pilot. The number of subcarriers may be dependent on the system bandwidth as well as the spacing between adjacent subcarriers. For example, NFFT may be equal to 128, 256, 512, 1024 or 2048. Only a subset of the NFFT total subcarriers may be usable for transmission of data and pilot, and the remaining subcarriers may serve as guard subcarriers to allow the system to meet spectral mask requirements. In the following description, a data subcarrier is a subcarrier used for data, and a pilot subcarrier is a subcarrier used for pilot. An OFDM symbol may be transmitted in each OFDM symbol period (or simply, a symbol period). Each OFDM symbol may include data subcarriers used to send data, pilot subcarriers used to send pilot, and guard subcarriers not used for data or pilot.

Figure 2:
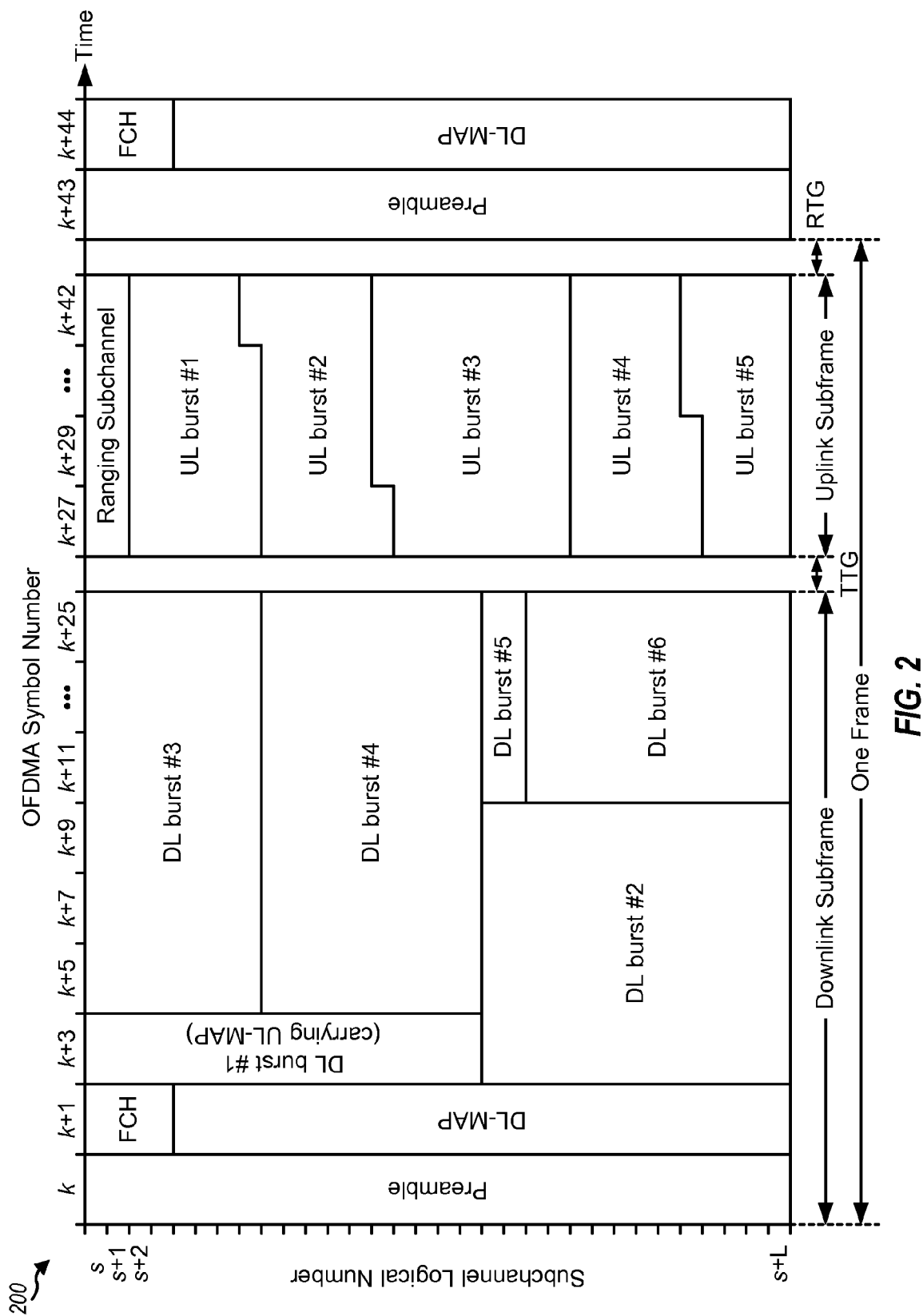
FIG. 2 shows an example frame structure.

FIG. 2 shows an example frame structure 200 for a time division duplex (TDD) mode in IEEE 802.16. The transmission timeline may be partitioned into units of frames. Each frame may span a predetermined time duration, e.g., 5 milliseconds (ms), and may be partitioned into a downlink subframe and an uplink subframe. In general, the downlink and uplink subframes may cover any fraction of a frame. The downlink and uplink subframes may be separated by a transmit transmission gap (TTG) and a receive transmission gap (RTG).

A number of physical subchannels may be defined. Each physical subchannel may include a set of subcarriers that may be contiguous or distributed across the system bandwidth. A number of logical subchannels may also be defined and may be mapped to the physical subchannels based on a known mapping. The logical subchannels may simplify the allocation of resources.

As shown in FIG. 2, a downlink subframe may include a preamble, a frame control header (FCH), a downlink map (DL-MAP), an uplink map (UL-MAP), and downlink (DL) bursts. The preamble may carry a known transmission that may be used by subscriber stations for frame detection and synchronization. The FCH may carry parameters used to receive the DL-MAP, the UL-MAP, and the downlink bursts. The DL-MAP may carry a DL-MAP message, which may include information elements (IEs) for various types of control information (e.g., resource allocation or assignment) for downlink access. The UL-MAP may carry a UL-MAP message, which may include IEs for various types of control information for uplink access. The downlink bursts may carry data for the subscriber stations being served. An uplink subframe may include uplink bursts, which may carry data transmitted by the subscriber stations scheduled for uplink transmission.

Figure 3:
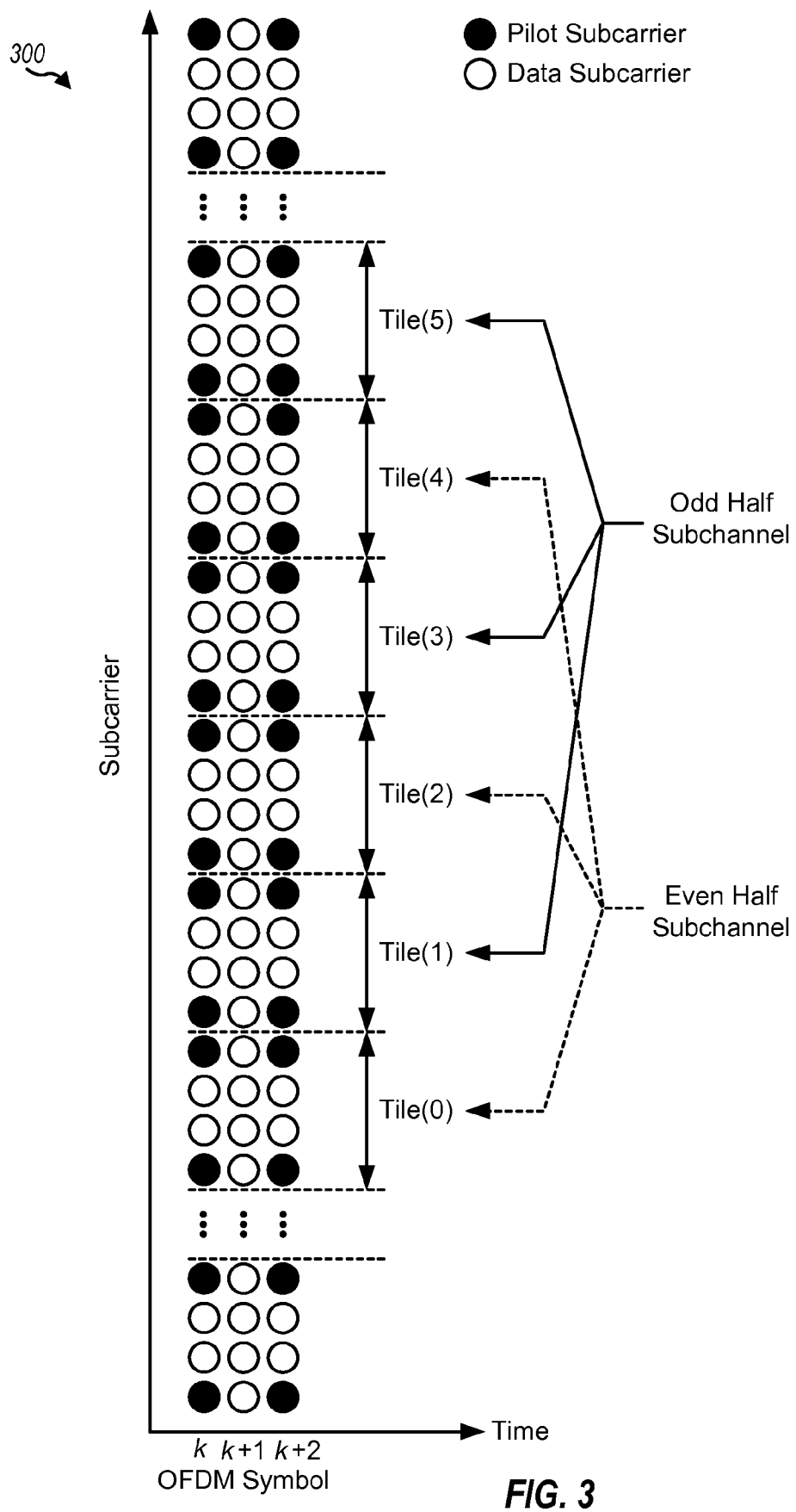
FIG. 3 shows a subcarrier structure for partial usage of subcarriers (PUSC).

FIG. 3 shows a subcarrier structure 300 for PUSC on the uplink in IEEE 802.16. The usable subcarriers may be divided into Ntiles physical tiles. Each physical tile may cover four subcarriers in each of three OFDM symbols and may include a total of 12 subcarriers. Each physical tile may include four pilot subcarriers at four corners of the tile and eight data subcarriers at eight remaining locations of the tile. For optional PUSC (not shown in FIG. 3), each physical tile may cover three subcarriers in each of three OFDM symbols and may include a total of 9 subcarriers. Each physical tile may include one pilot subcarrier at the center of the tile and eight data subcarriers at eight remaining locations of the tile. For both PUSC and optional PUSC, a data modulation symbol may be sent on each data subcarrier, and a pilot modulation symbol may be sent on each pilot subcarrier.

A number of logical tiles may be defined and may be mapped to the physical tiles based on a known mapping. A subchannel may be formed with six tiles labeled as Tile(0) through Tile(5). An uplink ACK channel may occupy a half subchannel, which may comprise three 4×3 tiles for PUSC or three 3×3 tiles for optional PUSC. The uplink ACK channel may occupy an even half subchannel and would then include Tile(0), Tile(2) and Tile(4). Alternatively, the uplink ACK channel may occupy an odd half subchannel and would then include Tile(1), Tile(3) and Tile(5). The tiles used for the uplink ACK channel may also be referred to as ACK resources, transmission resources, time frequency resources, etc.

Figure 4A:
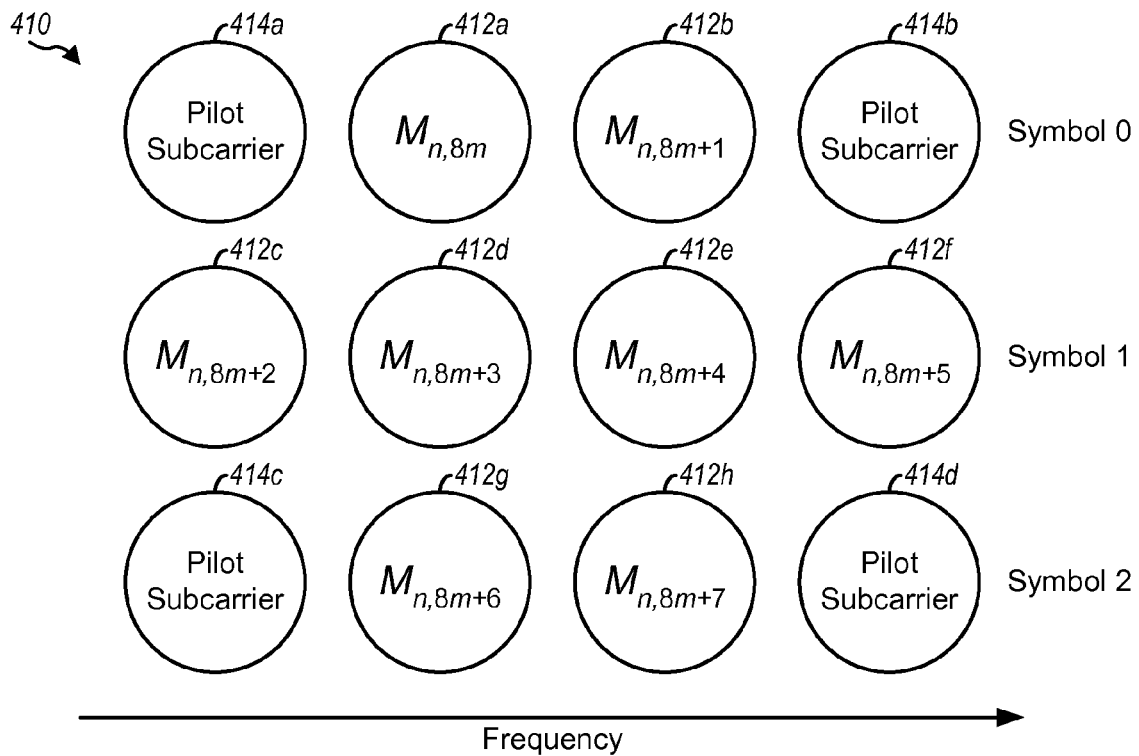
FIG. 4A shows a tile structure for an uplink ACK channel for PUSC.

FIG. 4A shows a tile structure 410 for the uplink ACK channel for PUSC. Eight modulation symbols may be sent on eight data subcarriers 412a through 412h in a 4×3 tile. These eight modulation symbols may be denoted as $M_{n,8m+k}$, for $0 \leq k \leq 7$, where $M_{n,8m+k}$ is the modulation symbol index of the k-th modulation symbol in the m-th tile of the n-th uplink ACK channel. Pilot modulation symbols may be sent on four pilot subcarriers 414a through 414d located at the four corners of the tile.

Figure 4B:
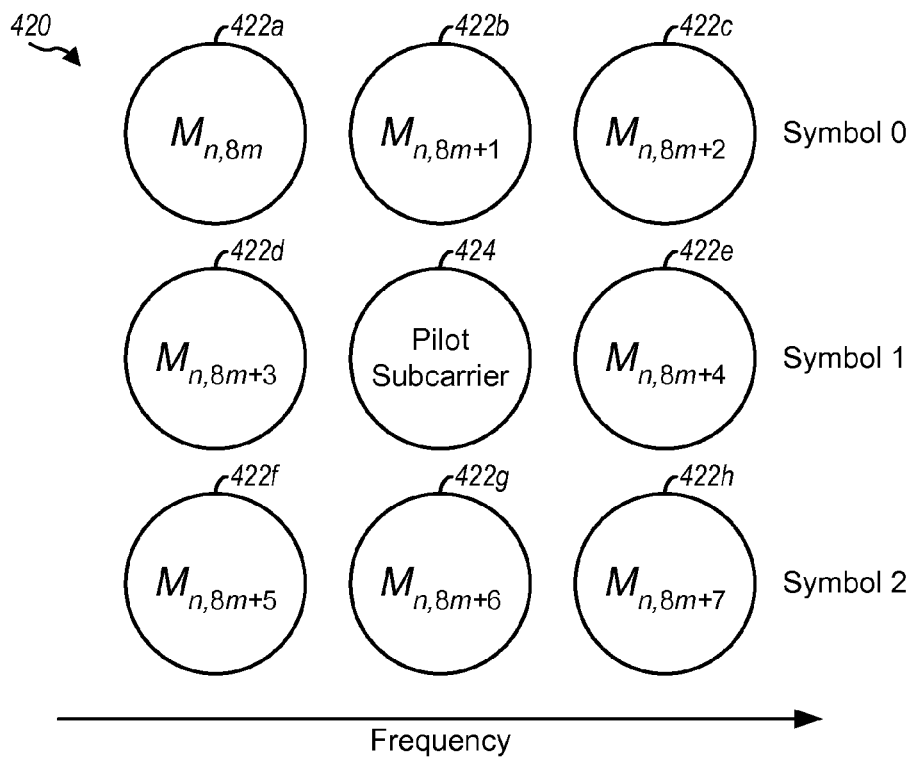
FIG. 4B shows a tile structure for an uplink ACK channel for optional PUSC.

FIG. 4B shows a tile structure 420 for the uplink ACK channel for optional PUSC. Eight modulation symbols may be sent on eight data subcarriers 422a through 422h in a 3×3 tile. These eight modulation symbols may be denoted as $M_{n,8m+k}$, for $0 \leq k \leq 7$. One pilot modulation symbol may be sent on a single pilot subcarrier 424 located at the center of the tile.

For the uplink ACK channel, eight orthogonal vectors may be defined and denoted as $V_0$ through $V_7$. Each vector may include eight modulation symbols to be sent on the eight data subcarriers in one tile. The eight vectors $V_0$ through $V_7$ are orthogonal to one another, which may be expressed as:

$$\|V_i^H V_l\| = 0, \text{ for } 0 \leq i \leq 7, 0 \leq l \leq 7 \text{ and } i \neq l, \quad \text{Eq (1)}$$

where "$H$" denotes a conjugate transpose.

FIG. 5 shows an example signal constellation for quadrature phase shift keying (QPSK) in IEEE 802.16. This signal constellation includes four signal points corresponding to four possible modulation symbols for QPSK. Each modulation symbol is a complex value of the form $x_i + jx_q$, where $x_i$ is a real component and $x_q$ is an imaginary component. The real component $x_i$ may have a value of either −1.0 or +1.0, and the imaginary component $x_q$ may also have a value of either −1.0 or +1.0. The four modulation symbols are denoted as P0, P1, P2 and P3, as shown in FIG. 5.

The eight vectors $V_0$ through $V_7$ may be formed with eight different permutations or sequences of QPSK modulation symbols P0, P1, P2 and P3. Table 1 gives the eight modulation symbols in each of the eight vectors $V_0$ through $V_7$, in accordance with one design.

TABLE 1

| Vector Index i | Vector | Modulation Symbols in Vector $V_i$ |
| --- | --- | --- |
| 0 | $V_0$ | P0, P1, P2, P3, P0, P1, P2, P3 |
| 1 | $V_1$ | P0, P3, P2, P1, P0, P3, P2, P1 |
| 2 | $V_2$ | P0, P0, P1, P1, P2, P2, P3, P3 |
| 3 | $V_3$ | P0, P0, P3, P3, P2, P2, P1, P1 |
| 4 | $V_4$ | P0, P0, P0, P0, P0, P0, P0, P0 |
| 5 | $V_5$ | P0, P2, P0, P2, P0, P2, P0, P2 |
| 6 | $V_6$ | P0, P2, P0, P2, P0, P2, P0 |
| 7 | $V_7$ | P0, P2, P2, P0, P2, P0, P0, P2 |

A subscriber station or user may send an ACK or a NAK for a data packet received from a base station. The ACK or NAK may be sent using a set of three vectors of eight modulation symbols, with each vector being sent in one tile. The ACK or NAK may be mapped to three vectors as shown in Table 2.

TABLE 2

| ACK 1-bit symbol | ACK/NAK | Vectors for Tiles 1, 2, 3 |
| --- | --- | --- |
| 0 | ACK | $V_0, V_0, V_0$ |
| 1 | NAK | $V_4, V_7, V_2$ |

In the design shown in Table 2, the user may send vector $V_0$ in the first tile, vector $V_0$ in the second tile, and vector $V_0$ in the third tile for the uplink ACK channel to convey an ACK. The user may send vector $V_4$ in the first tile, vector $V_7$ in the second tile, and vector $V_2$ in the third tile to convey a NAK. The base station may detect for the ACK or NAK from the user by correlating the received symbols in the three tiles against vectors $V_0, V_0,$ and $V_0$ and also against vectors $V_4, V_7,$ and $V_2$, as described below.

A single user may be assigned an uplink ACK channel and may send an ACK or a NAK on the uplink ACK channel as shown in Table 2. In this case, only two vectors are used in each tile, i.e., vectors $V_0$ and $V_4$ in the first tile, vectors $V_0$ and $V_7$ in the second tile, and vectors $V_0$ and $V_2$ in the third tile. For each tile, remaining six vectors are not used.

In an aspect, up to four users may share an uplink ACK channel and may simultaneously send their ACK/NAK in the same three tiles. Each user may use a different pair of vectors in each tile so that each vector is used by at most one user in any given tile. Since the eight vectors are orthogonal to one another, up to four users may be multiplexed on the same uplink ACK channel with little or no degradation in performance when the channel response is relatively flat across each tile.

In one design, up to four users may simultaneously send ACK/NAK on the same uplink ACK channel as shown in Table 3.

TABLE 3

| User | ACK/NAK | Vectors for Tiles 1, 2, 3 |
| --- | --- | --- |
| 1 | ACK | $V_0, V_0, V_0$ |
|   | NAK | $V_1, V_1, V_1$ |
| 2 | ACK | $V_2, V_2, V_2$ |
|   | NAK | $V_3, V_3, V_3$ |
| 3 | ACK | $V_4, V_4, V_4$ |
|   | NAK | $V_5, V_5, V_5$ |
| 4 | ACK | $V_6, V_6, V_6$ |
|   | NAK | $V_7, V_7, V_7$ |

In the design shown in Table 3, each user may be assigned two vectors for sending ACK/NAK. One vector may be sent in each of the three tiles for the uplink ACK channel to convey an ACK, and the other vector may be sent in each of the three tiles to convey a NAK. For example, a user may be assigned vectors $V_4$ and $V_5$. This user may send vector $V_4$ in each of the three tiles to convey an ACK and may send vector $V_5$ in each of the three tiles to convey a NAK.

In another design, up to four users may simultaneously send ACK/NAK on the same uplink ACK channel as shown in Table 4. In this design, user 1 may send ACK/NAK using the vectors shown in Table 2. Users 2, 3 and 4 may send ACK/NAK using other vectors not used by user 1 in each tile.

TABLE 4

| User | ACK/NAK | Vectors for Tiles 1, 2, 3 |
| --- | --- | --- |
| 1 | ACK | $V_0, V_0, V_0$ |
|   | NAK | $V_4, V_7, V_2$ |
| 2 | ACK | $V_1, V_1, V_1$ |
|   | NAK | $V_2, V_4, V_7$ |
| 3 | ACK | $V_3, V_3, V_3$ |
|   | NAK | $V_7, V_2, V_4$ |
| 4 | ACK | $V_5, V_5, V_5$ |
|   | NAK | $V_6, V_6, V_6$ |

In the design shown in Table 4, each user may be assigned two sets of three vectors for sending ACK/NAK. One set of three vectors may be sent in the three tiles for the uplink ACK channel to convey an ACK, and the other set of three vectors may be sent in the three tiles to convey a NAK. For example, a user may be assigned a first set of vectors $V_3, V_3$ and $V_3$ for ACK and a second set of vectors $V_7, V_2$ and $V_4$ for NAK. This user may send the first set of vectors $V_3, V_3$ and $V_3$ in the three tiles to convey an ACK and may send the second set of vectors $V_7, V_2$ and $V_4$ in the three tiles to convey a NAK.

Tables 3 and 4 show two example designs of multiplexing up to four users on the same uplink ACK channel. Up to four users may also be multiplexed based on other designs with different assignments of vectors to each user for sending ACK/NAK.

For tile structure 410 shown in FIG. 4A, four pilot subcarriers are available in each tile. These four pilot subcarriers may be used in various manners to allow the base station to perform channel estimation for the users and/or interference estimation.

In one design, each user may be assigned one pilot subcarrier in each tile. For example, user 1 may be assigned pilot subcarrier 414a in FIG. 4A, user 2 may be assigned pilot subcarrier 414b, user 3 may be assigned pilot subcarrier 414c, and user 4 may be assigned pilot subcarrier 414d. Each user may transmit one pilot modulation symbol on its assigned pilot subcarrier. The base station may derive a channel estimate for each user based on the pilot modulation symbol received from that user.

In another design, four orthogonal vectors $W_0$ through $W_3$ may be defined, with each vector including four modulation symbols. For example, vector $W_0$ may include modulation symbols P0, P0, P0 and P0, vector $W_1$ may include modulation symbols P0, P2, P0 and P2, vector $W_2$ may include modulation symbols P0, P1, P2 and P3, and vector $W_3$ may include modulation symbols P1, P0, P3 and P2. Each user may be assigned one of the four vectors and may transmit the four modulation symbols in its assigned vector on the four pilot subcarriers. The base station may derive a channel estimate for each user based on the vector of four modulation symbols sent by that user.

In yet another design, the four pilot subcarriers are not assigned to the users, and no signals are sent on these pilot subcarriers. The base station may estimate the interference for a tile based on four received symbols from the four pilot subcarriers. The base station may use the interference estimate for detection, as described below.

For tile structure 420 shown in FIG. 4B, one pilot subcarrier is available in each tile. In one design, this pilot subcarrier is not assigned to any user and may be used by the base station for interference estimation.

In another design, M orthogonal vectors may be defined, where M>8, with each vector including 12 modulation symbols. Up to M/2 users may share one uplink ACK channel, with each user being assigned a different pair of vectors for each tile. Each user may send 12 modulation symbols in one vector on the 12 subcarriers of a tile for an ACK and may send 12 modulation symbols in another vector on the 12 subcarriers for a NAK.

In general, any number of orthogonal vectors may be defined and may be limited by the number of subcarriers in each tile. Each vector may include one modulation symbol for each subcarrier used for sending ACK/NAK. The modulation symbols may be from QPSK or some other modulation scheme. Each vector may be assigned to only one user in any given tile in order to achieve orthogonality among all users sharing the tile. The number of users that can share a given tile is limited by the number of orthogonal vectors.

Each user may be assigned two sets of vectors for the uplink ACK channel—one set of vectors for sending ACK and another set of vectors for sending NAK. Each set may include one vector for each tile used for sending ACK/NAK. In the designs described above, three tiles are used for sending ACK/NAK, and each set may include three vectors.

A user may be assigned an uplink ACK channel and two sets of vectors for ACK/NAK in various manners. In one design, an ACK assignment may be implicit and determined, e.g., based on downlink resources used to send data to the user. In this design, the downlink resources may be mapped to a specific uplink ACK channel as well as two specific sets of vectors based on a mapping that is known a priori by the base station and the user. The user may then send ACK/NAK on this specific uplink ACK channel using the two specific sets of vectors. This design may avoid having to explicitly send signaling on the downlink to convey the assigned uplink ACK channel and two sets of vectors. In another design, an ACK assignment may be explicit and indicated by a UL-MAP message or some other signaling sent on the downlink.

Multiple users may share an uplink ACK channel and may send ACK/NAK on the same set of tiles. A base station may receive eight symbols on eight data subcarriers in each tile. If no pilot modulation symbols are sent by the users, then the base station may perform non-coherent detection on the received symbols to determine whether an ACK or a NAK was sent by each user. Non-coherent detection refers to detection without the aid of a pilot reference. The base station may perform non-coherent detection for the uplink ACK channel by correlating three vectors of received symbols for the three tiles against each set of vectors that could have been sent on the uplink ACK channel by each user q, as follows:

$$A_q = \sum_{m=1}^{3} G_m \cdot \|V_{qa,m}^H R_m\|, \text{ and} \qquad \text{Eq (2)}$$

$$N_q = \sum_{m=1}^{3} G_m \cdot \|V_{qn,m}^H R_m\|, \qquad \text{Eq (3)}$$

where $R_m$ is a vector of received symbols from the m-th tile, $V_{qa,m}$ is a vector sent by user q on the m-th tile for an ACK, $V_{qn,m}$ is a vector sent by user q on the m-th tile for a NAK, $G_m$ is a scaling factor for the m-th tile, $A_q$ is a metric for ACK for user q, and $N_q$ is a metric for NAK for user q.

As an example, for user 1 in the design shown in Table 4, $V_{qa,m}$ is equal to $V_0$, $V_0$ and $V_0$ for m=1, 2, 3, respectively, and $V_{qn,m}$ is equal to $V_4$, $V_7$ and $V_2$ for m=1, 2, 3, respectively. The scaling factor $G_m$ may be determined based on an interference estimate obtained for the m-th tile. $G_m$ may be inversely related to the magnitude of the interference, so that received symbols from a tile with large interference may be given less weight, and vice versa. The base station may obtain one pair of $A_q$ and $N_q$ for each user q. The base station may then determine whether an ACK or a NAK was sent by user q, as follows:

If $A_q > N_q$, then declare an ACK was sent by user q, $\qquad$ Eq (4)

else declare a NAK was sent by user q.

If at least one pilot modulation symbol is received from each user, then the base station may perform coherent detection on the received symbols to determine whether an ACK or a NAK was sent by each user. Coherent detection refers to detection with the aid of a pilot reference. In one design, the base station may perform coherent detection for each user q as follows:

$$A_q = \sum_{m=1}^{3} G_m \cdot \|V_{qa,m}^H R_m H_{q,m}^*\|, \text{ and} \qquad \text{Eq (5)}$$

$$N_q = \sum_{m=1}^{3} G_m \cdot \|V_{qn,m}^H R_m H_{q,m}^*\|, \qquad \text{Eq (6)}$$

where $H_{q,m}$ is a channel gain estimate for the m-th tile for user q, and

"*" denotes a complex conjugate.

The channel gain estimate $H_{q,m}$ may be obtained based on one or more pilot modulation symbols received from user q in the m-th tile.

In another design, the base station may perform coherent detection for each user q as follows:

$$A_q = \sum_{m=1}^{3} G_m \cdot \|V_{qa,m}^H H_{q,m}^H R_m\|, \text{ and} \quad \text{Eq (7)}$$

$$N_q = \sum_{m=1}^{3} G_m \cdot \|V_{qn,m}^H H_{q,m}^H R_m\|, \quad \text{Eq (8)}$$

where $H_{q,m}$ is a diagonal matrix with channel gain estimates along the diagonal for all data subcarriers in the m-th tile for user q. $H_{q,m}$ may be obtained based on one or more pilot modulation symbols received from user q in the m-th tile.

The base station may obtain $A_q$ and $N_q$ for each user q and may determine whether an ACK or a NAK was sent by user q as shown in equation (4). The base station may also perform correlation of the vectors of received symbols with the vectors of modulation symbols and detection of the signaling value in other manners.

The techniques described herein may be used to send ACK/NAK on the uplink, as described above. The techniques may also be used to send other types of signaling such as power control information, channel quality information (CQI), beamforming feedback information, etc. In general, a user may be assigned L sets of vectors for L possible signaling values, where $L \geq 1$. Each set of vectors may be referred to as a codeword, a vector sequence, etc. The user may send one set of vectors for a signaling value being conveyed.

FIG. 6 shows a design of a process 600 for sending signaling (e.g., ACK/NAK) in a wireless communication system. Process 600 may be performed by a subscriber station or some other entity. The subscriber station may determine at least one vector of modulation symbols to send in at least one tile for a signaling value, one vector of modulation symbols in each tile (block 612). A vector of modulation symbols may also be referred to as a sequence of modulation symbols, a set of modulation symbols, etc. The vector of modulation symbols for each tile may be orthogonal to at least one other vector of modulation symbols usable by at least one other subscriber station in the tile. In one design, the vector to send by the subscriber station and the at least one other vector usable by the at least one other subscriber station in each tile may be from a group of eight orthogonal vectors. In other designs, the group may include fewer or more orthogonal vectors.

The subscriber station may map the modulation symbols in each of the at least one vector to multiple subcarriers in a different one of the at least one tile (block 614). In one design, each vector may include eight modulation symbols that may be mapped to eight subcarriers in one tile. In another design, each vector may include 12 modulation symbols that may be mapped to 12 subcarriers in one tile. Each vector may also include fewer or more modulation symbols. Each tile may have any shape and include any number of subcarriers. The subscriber station may also map at least one pilot modulation symbol to at least one subcarrier in each tile or may map no pilot modulation symbols in each tile. The subscriber station may send the mapped modulation symbols in the at least one tile to convey the signaling value (block 616).

In one design, three vectors of modulation symbols are sent in three tiles for the signaling value. The subscriber station may map the modulation symbols in each vector to multiple subcarriers in a different tile. The subscriber station may then send the mapped modulation symbols in the three tiles to convey the signaling value. Fewer or more vectors of modulation symbols may also be sent for the signaling value.

In one design, the signaling value comprises an ACK or a NAK. The subscriber station may determine a first set of at least one vector (e.g., a first set of three vectors) of modulation symbols usable by the subscriber station for ACK. The subscriber station may also determine a second set of at least one vector (e.g., a second set of three vectors) of modulation symbols usable by the subscriber station for NAK. The subscriber station may select the first vector set as the at least one vector of modulation symbols to send if the signaling value comprises an ACK. The subscriber station may select the second vector set as the at least one vector of modulation symbols to send if the signaling value comprises a NAK.

In general, the subscriber station may determine the signaling value from among multiple possible signaling values. The subscriber station may then determine the at least one vector of modulation symbols to send from among multiple sets of at least one vector of modulation symbols for the multiple possible signaling values.

In one design, the subscriber station may receive data via downlink resources and may determine multiple sets of at least one vector of modulation symbols (e.g., one set for ACK and another set for NAK) usable by the subscriber station based on the downlink resources. The subscriber station may then select one of the multiple vector sets as the at least one vector of modulation symbols to send based on the signaling value. The subscriber station may also determine the at least one tile to use based on the downlink resources.

In another design, the subscriber station may receive signaling indicative of multiple sets of at least one vector of modulation symbols usable by the subscriber station. For example, the subscriber station may obtain its identifier, a channel identifier, or some other identifier from the signaling and may determine the multiple vector sets usable by the subscriber station based on the identifier. The subscriber station may also obtain an assignment from the signaling and may determine the multiple vector sets usable by the subscriber station based on the assignment. In any case, the subscriber station may select one of the multiple vector sets as the at least one vector of modulation symbols to send based on the signaling value.

FIG. 7 shows a design of an apparatus 700 for sending signaling in a wireless communication system. Apparatus 700 includes a module 712 to determine at least one vector of modulation symbols to send in at least one tile for a signaling value (e.g., an ACK or a NAK), one vector of modulation symbols in each tile, a module 714 to map the modulation symbols in each of the at least one vector to multiple subcarriers in a different one of the at least one tile, and a module 716 to send the mapped modulation symbols in the at least one tile to convey the signaling value.

Figure 8:
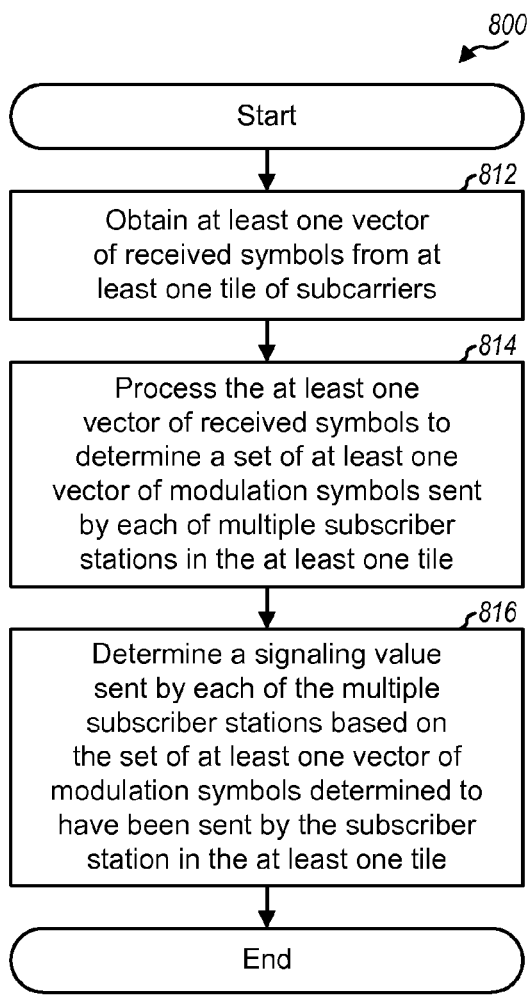
FIG. 8 shows a process for receiving signaling by a base station.

FIG. 8 shows a design of a process 800 for receiving signaling (e.g., ACK/NAK) in a wireless communication system. Process 800 may be performed by a base station or some other entity. The base station may obtain at least one vector of received symbols from at least one tile of subcarriers (block 812). In one design, one vector of eight received symbols may be obtained from eight subcarriers in each tile. In another design, one vector of 12 received symbols may be obtained from 12 subcarriers in each tile. The base station may process the at least one vector of received symbols to determine a set of at least one vector of modulation symbols sent by each of multiple subscriber stations in the at least one tile (block 814). The base station may then determine a signaling value sent by each of the multiple subscriber stations based on the set of at least one vector of modulation symbols determined to have been sent by the subscriber station in the at least one tile (block 816).

In one design, the base station may obtain three vectors of received symbols from three tiles. The base station may process the three vectors of received symbols to determine a set of three vectors of modulation symbols sent by each subscriber station in the three tiles. The base station may then determine the signaling value sent by each subscriber station based on the set of three vectors of modulation symbols determined to have been sent by that subscriber station in the three tiles.

In one design, for each subscriber station, the base station may correlate the three vectors of received symbols with three vectors of modulation symbols usable by that subscriber station for ACK to obtain a first value, e.g., as shown in equation (2), (5) or (7). The base station may also correlate the three vectors of received symbols with three vectors of modulation symbols usable by the subscriber station for NAK to obtain a second value, e.g., as shown in equation (3), (6) or (8). The base station may then determine whether an ACK or a NAK was sent by the subscriber station based on the first and second values, e.g., as shown in equation (4).

In general, the signaling value from each subscriber station may be one of multiple possible signaling values, with each possible signaling value being associated with a different set of at least one vector of modulation symbols to send by the subscriber station in the at least one tile. For each subscriber station, the base station may correlate the at least one vector of received symbols with each of multiple sets of at least one vector of modulation symbols usable by that subscriber station for the multiple possible signaling values. The base station may then determine the signaling value sent by the subscriber station based on correlation results for the multiple vector sets.

Figure 9:
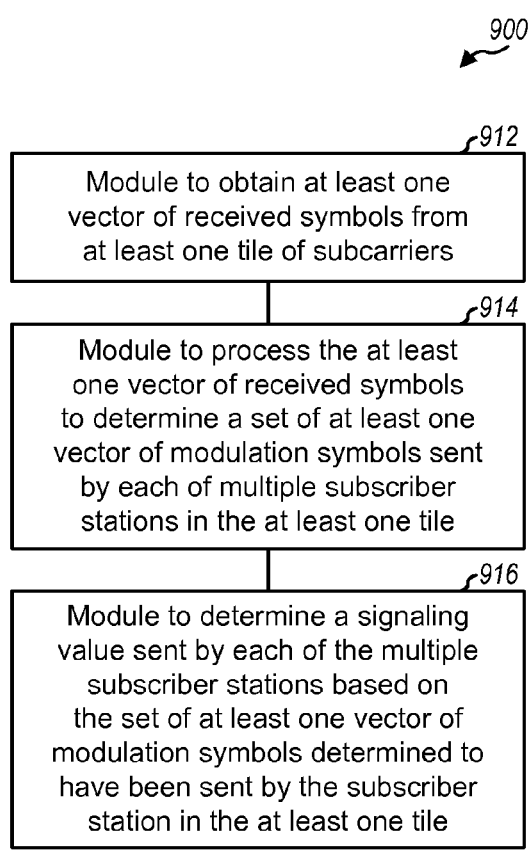
FIG. 9 shows an apparatus for receiving signaling.

FIG. 9 shows a design of an apparatus 900 for receiving signaling in a wireless communication system. Apparatus 900 includes a module 912 to obtain at least one vector of received symbols from at least one tile of subcarriers, a module 914 to process the at least one vector of received symbols to determine a set of at least one vector of modulation symbols sent by each of multiple subscriber stations in the at least one tile, and a module 916 to determine a signaling value sent by each of the multiple subscriber stations based on the set of at least one vector of modulation symbols determined to have been sent by the subscriber station in the at least one tile.

Figure 10:
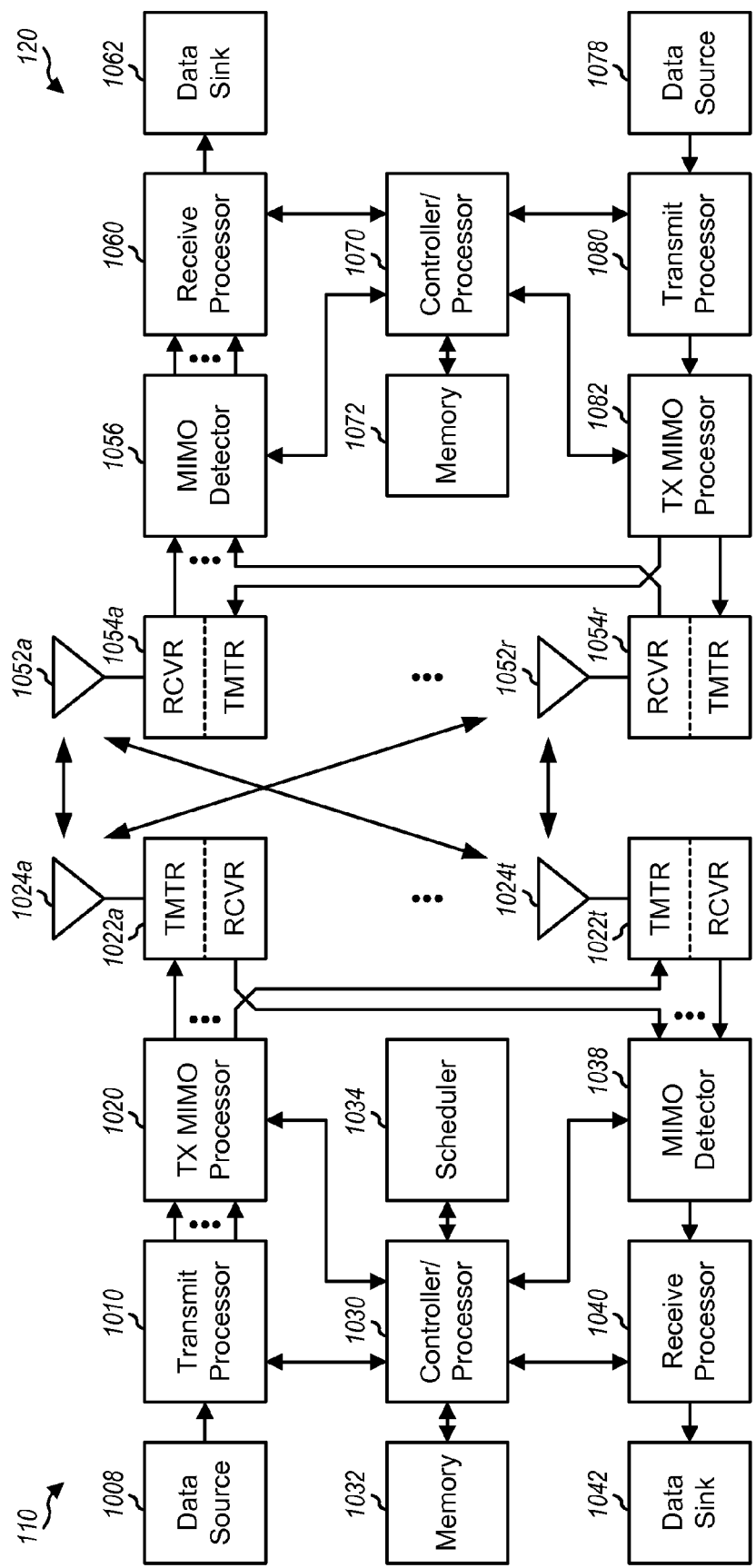
FIG. 10 shows a block diagram of the base station and the subscriber station.

The modules in FIGS. 7 and 9 may comprise processors, electronics devices, hardware devices, electronics components, logical circuits, memories, etc., or any combination thereof FIG. 10 shows a block diagram of a design of a base station 110 and a subscriber station 120, which are one of the base stations and one of the subscriber stations in FIG. 1. In this design, base station 110 is equipped with T antennas 1024a through 1024t, and subscriber station 120 is equipped with R antennas 1052a through 1052r, where in general T≧1 and R≧1.

At base station 110, a transmit processor 1010 may receive data for one or more subscriber stations from a data source 1008. Transmit processor 1010 may process (e.g., format, encode, interleave, and symbol map) the data for each subscriber station to obtain modulation symbols for that subscriber station. Transmit processor 1010 may also process overhead information (e.g., MAP messages) to obtain modulation symbols for the overhead information. A transmit (TX) MIMO processor 1020 may multiplex the modulation symbols for all subscriber stations and overhead information with pilot modulation symbols using any multiplexing scheme. TX MIMO processor 1020 may spatially process the multiplexed modulation symbols and provide T output symbol streams to T transmitters (TMTR) 1022a through 1022t. Each transmitter 1022 may process a respective output symbol stream (e.g., for OFDM) to obtain an output chip stream and may further condition (e.g., convert to analog, amplify, filter, and upconvert) the output chip stream to obtain a downlink signal. T downlink signals from transmitters 1022a through 1022t may be transmitted via T antennas 1024a through 1024t, respectively.

At subscriber station 120, antennas 1052a through 1052r may receive the downlink signals from base station 110 and provide received signals to receivers (RCVR) 1054a through 1054r, respectively. Each receiver 1054 may condition (e.g., filter, amplify, downconvert, and digitize) its received signal to obtain samples and may further process the samples (e.g., for OFDM) to obtain received symbols. A MIMO detector 1056 may process the received symbols from all R receivers 1054a through 1054r based on a MIMO receiver processing technique to obtain detected symbols, which are estimates of the modulation symbols transmitted by base station 110. A receive processor 1060 may process (e.g., demodulate, deinterleave, and decode) the detected symbols, provide decoded data for subscriber station 120 to a data sink 1062, and provide overhead information to a controller/processor 1070. In general, the processing by MIMO detector 1056 and receive processor 1060 is complementary to the processing by TX MIMO processor 1020 and transmit processor 1010 at base station 110.

On the uplink, at subscriber station 120, data from a data source 1078 and signaling (e.g., ACK/NAK) from a controller/processor 1070 may be processed by a transmit processor 1080, further processed by a modulator 1082, conditioned by transmitters 1054a through 1054r, and transmitted to base station 110. At base station 110, the uplink signals from subscriber station 120 may be received by antennas 1024, conditioned by receivers 1022, detected by a MIMO detector 1038, and processed by a receive processor 1040 to obtain the data and signaling transmitted by subscriber station 120. The data may be provided to a data sink 1042, and the signaling may be provided to a controller/processor 1030.

Controllers/processors 1030 and 1070 may direct the operation at base station 110 and subscriber station 120, respectively. Controller/processor 1030 may perform or direct process 800 in FIG. 8 and/or other processes for the techniques described herein. Controller/processor 1070 may perform or direct process 600 in FIG. 6 and/or other processes for the techniques described herein. Memories 1032 and 1072 may store data and program codes for base station 110 and subscriber station 120, respectively. A scheduler 1034 may schedule subscriber stations for transmission on the downlink and/or uplink and may provide assignments of resources for the scheduled subscriber stations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
at least one processor configured to determine at least one vector of modulation symbols to send by a subscriber station in at least one tile for a signaling value, one vector of modulation symbols in each tile, the vector of modulation symbols for each tile being orthogonal to at least one other vector of modulation symbols usable by at least one other subscriber station in the tile, to map the modulation symbols in each of the at least one vector to multiple subcarriers in a different one of the at least one tile, and to send the mapped modulation symbols in the at least one tile to convey the signaling value; and
a memory coupled to the at least one processor.

2. The apparatus of claim 1, wherein the at least one processor is configured to determine three vectors of modulation symbols to send in three tiles for the signaling value, to map the modulation symbols in each of the three vectors to multiple subcarriers in a different one of the three tiles, and to send the mapped modulation symbols in the three tiles to convey the signaling value.

3. The apparatus of claim 2, wherein the at least one processor is configured to select three vectors of modulation symbols usable by the subscriber station for acknowledgement (ACK) as the three vectors of modulation symbols to send if the signaling value comprises an ACK, and to select three vectors of modulation symbols usable by the subscriber station for negative acknowledgement (NAK) as the three vectors of modulation symbols to send if the signaling value comprises a NAK.

4. The apparatus of claim 1, wherein the at least one processor is configured to determine a first set of at least one vector of modulation symbols usable by the subscriber station for acknowledgement (ACK), to determine a second set of at least one vector of modulation symbols usable by the subscriber station for negative acknowledgement (NAK), to select the first set of at least one vector of modulation symbols as the at least one vector of modulation symbols to send if the signaling value comprises an ACK, and to select the second set of at least one vector of modulation symbols as the at least one vector of modulation symbols to send if the signaling value comprises a NAK.

5. The apparatus of claim 1, wherein the at least one processor is configured to determine the signaling value from among multiple possible signaling values, and to determine the at least one vector of modulation symbols to send from among multiple sets of at least one vector of modulation symbols for the multiple possible signaling values.

6. The apparatus of claim 1, wherein each of the at least one vector to send comprises eight modulation symbols, and wherein the at least one processor is configured to map the eight modulation symbols in each of the at least one vector to eight subcarriers in a different one of the at least one tile.

7. The apparatus of claim 1, wherein each of the at least one vector to send comprises 12 modulation symbols, and wherein the at least one processor is configured to map the 12 modulation symbols in each of the at least one vector to 12 subcarriers in a different one of the at least one tile.

8. The apparatus of claim 1, wherein the at least one processor is configured to map at least one pilot modulation symbol to at least one pilot subcarrier in each of the at least one tile.

9. The apparatus of claim 1, wherein the vector to send by the subscriber station and the at least one other vector usable by the at least one other subscriber station in each tile are from a group of eight orthogonal vectors.

10. The apparatus of claim 1, wherein the at least one processor is configured to receive data via downlink resources, to determine multiple sets of at least one vector of modulation symbols usable by the subscriber station based on the downlink resources, and to select one of the multiple sets of at least one vector of modulation symbols as the at least one vector of modulation symbols to send based on the signaling value.

11. The apparatus of claim 10, wherein the at least one processor is configured to determine the at least one tile based on the downlink resources.

12. The apparatus of claim 1, wherein the at least one processor is configured to receive signaling indicative of multiple sets of at least one vector of modulation symbols usable by the subscriber station, and to select one of the multiple sets of at least one vector of modulation symbols as the at least one vector of modulation symbols to send based on the signaling value.

13. The apparatus of claim 12, wherein the at least one processor is configured to obtain an identifier for the subscriber station or a channel from the signaling, and to determine the multiple sets of at least one vector of modulation symbols usable by the subscriber station based on the identifier.

14. A method for wireless communication, comprising:
determining at least one vector of modulation symbols to send by a subscriber station in at least one tile for a signaling value, one vector of modulation symbols in each tile, the vector of modulation symbols for each tile being orthogonal to at least one other vector of modulation symbols usable by at least one other subscriber station in the tile;
mapping the modulation symbols in each of the at least one vector to multiple subcarriers in a different one of the at least one tile; and
sending the mapped modulation symbols in the at least one tile to convey the signaling value.

15. The method of claim 14, wherein the determining at least one vector of modulation symbols comprises determining three vectors of modulation symbols to send in three tiles for the signaling value, wherein the mapping the modulation symbols comprises mapping the modulation symbols in each of the three vectors to multiple subcarriers in a different one of the three tiles, and wherein the sending the mapped modulation symbols comprises sending the mapped modulation symbols in the three tiles to convey the signaling value.

16. The method of claim 15, wherein the determining three vectors of modulation symbols comprises
selecting three vectors of modulation symbols usable by the subscriber station for acknowledgement (ACK) as the three vectors of modulation symbols to send if the signaling value comprises an ACK, and
selecting three vectors of modulation symbols usable by the subscriber station for negative acknowledgement (NAK) as the three vectors of modulation symbols to send if the signaling value comprises a NAK.

17. The method of claim 14, wherein the determining at least one vector of modulation symbols comprises
determining the signaling value from among multiple possible signaling values, and
determining the at least one vector of modulation symbols to send from among multiple sets of at least one vector of modulation symbols for the multiple possible signaling values.

18. The method of claim 14, further comprising:
receiving data via downlink resources; and
determining multiple sets of at least one vector of modulation symbols usable by the subscriber station based on the downlink resources, and
wherein the determining at least one vector of modulation symbols comprises selecting one of the multiple sets of at least one vector of modulation symbols as the at least one vector of modulation symbols to send based on the signaling value.

19. The method of claim 14, further comprising:
receiving signaling indicative of multiple sets of at least one vector of modulation symbols usable by the subscriber station, and
wherein the determining at least one vector of modulation symbols comprises selecting one of the multiple sets of at least one vector of modulation symbols as the at least one vector of modulation symbols to send based on the signaling value.

20. An apparatus for wireless communication, comprising:
means for determining at least one vector of modulation symbols to send by a subscriber station in at least one tile for a signaling value, one vector of modulation symbols in each tile, the vector of modulation symbols for each tile being orthogonal to at least one other vector of modulation symbols usable by at least one other subscriber station in the tile;
means for mapping the modulation symbols in each of the at least one vector to multiple subcarriers in a different one of the at least one tile; and
means for sending the mapped modulation symbols in the at least one tile to convey the signaling value.

21. The apparatus of claim 20, wherein the means for determining at least one vector of modulation symbols comprises means for determining three vectors of modulation symbols to send in three tiles for the signaling value, wherein the means for mapping the modulation symbols comprises means for mapping the modulation symbols in each of the three vectors to multiple subcarriers in a different one of the three tiles, and wherein the means for sending the mapped modulation symbols comprises means for sending the mapped modulation symbols in the three tiles to convey the signaling value.

22. The apparatus of claim 21, wherein the means for determining three vectors of modulation symbols comprises
means for selecting three vectors of modulation symbols usable by the subscriber station for acknowledgement (ACK) as the three vectors of modulation symbols to send if the signaling value comprises an ACK, and
means for selecting three vectors of modulation symbols usable by the subscriber station for negative acknowledgement (NAK) as the three vectors of modulation symbols to send if the signaling value comprises a NAK.

23. The apparatus of claim 20, wherein the means for determining at least one vector of modulation symbols comprises
   means for determining the signaling value from among multiple possible signaling values, and
   means for determining the at least one vector of modulation symbols to send from among multiple sets of at least one vector of modulation symbols for the multiple possible signaling values.

24. The apparatus of claim 20, further comprising:
   means for receiving data via downlink resources; and
   means for determining multiple sets of at least one vector of modulation symbols usable by the subscriber station based on the downlink resources, and
   wherein the means for determining at least one vector of modulation symbols comprises means for selecting one of the multiple sets of at least one vector of modulation symbols as the at least one vector of modulation symbols to send based on the signaling value.

25. The apparatus of claim 20, further comprising:
   means for receiving signaling indicative of multiple sets of at least one vector of modulation symbols usable by the subscriber station, and
   wherein the means for determining at least one vector of modulation symbols comprises means for selecting one of the multiple sets of at least one vector of modulation symbols as the at least one vector of modulation symbols to send based on the signaling value.

26. A computer program product, comprising:
   a computer-readable medium comprising:
      code for causing at least one computer to determine at least one vector of modulation symbols to send by a subscriber station in at least one tile for a signaling value, one vector of modulation symbols in each tile, the vector of modulation symbols for each tile being orthogonal to at least one other vector of modulation symbols usable by at least one other subscriber station in the tile;
      code for causing at least one computer to map the modulation symbols in each of the at least one vector to multiple subcarriers in a different one of the at least one tile; and
      code for causing the at least one computer to send the mapped modulation symbols in the at least one tile to convey the signaling value.

27. The computer program product of claim 26, wherein the computer-readable medium further comprises:
   code for causing the at least one computer to determine three vectors of modulation symbols to send in three tiles for the signaling value;
   code for causing the at least one computer to map the modulation symbols in each of the three vectors to multiple subcarriers in a different one of the three tiles; and
   code for causing the at least one computer to send the mapped modulation symbols in the three tiles to convey the signaling value.

28. The computer program product of claim 27, wherein the computer-readable medium further comprises:
   code for causing the at least one computer to select three vectors of modulation symbols usable by the subscriber station for acknowledgement (ACK) as the three vectors of modulation symbols to send if the signaling value comprises an ACK; and
   code for causing the at least one computer to select three vectors of modulation symbols usable by the subscriber station for negative acknowledgement (NAK) as the three vectors of modulation symbols to send if the signaling value comprises a NAK.

29. The computer program product of claim 26, wherein the computer-readable medium further comprises:
   code for causing the at least one computer to determine the signaling value from among multiple possible signaling values, and
   code for causing the at least one computer to determine the at least one vector of modulation symbols to send from among multiple sets of at least one vector of modulation symbols for the multiple possible signaling values.

30. An apparatus for wireless communication, comprising:
   at least one processor configured to obtain at least one vector of received symbols from at least one tile, to process the at least one vector of received symbols to determine a set of at least one vector of modulation symbols sent by each of multiple subscriber stations in the at least one tile, and to determine a signaling value sent by each of the multiple subscriber stations based on the set of at least one vector of modulation symbols determined to have been sent by the subscriber station in the at least one tile; and
   a memory coupled to the at least one processor.

31. The apparatus of claim 30, wherein multiple vectors of modulation symbols are sent by the multiple subscriber stations in each tile and are orthogonal to one another.

32. The apparatus of claim 30, wherein each vector of received symbols comprises eight received symbols, and wherein the at least one processor is configured to obtain each of the at least one vector of eight received symbols from eight subcarriers in a different one of the at least one tile.

33. The apparatus of claim 30, wherein the at least one processor is configured to obtain three vectors of received symbols from three tiles, to process the three vectors of received symbols to determine a set of three vectors of modulation symbols sent by each of the multiple subscriber stations in the three tiles, and to determine the signaling value sent by each of the multiple subscriber stations based on the set of three vectors of modulation symbols determined to have been sent by the subscriber station in the three tiles.

34. The apparatus of claim 33, wherein for each subscriber station the at least one processor is configured to correlate the three vectors of received symbols with three vectors of modulation symbols usable by the subscriber station for acknowledgement (ACK) to obtain a first value, to correlate the three vectors of received symbols with three vectors of modulation symbols usable by the subscriber station for negative acknowledgement (NAK) to obtain a second value, and to determine whether an ACK or a NAK was sent by the subscriber station based on the first and second values.

35. The apparatus of claim 30, wherein the signaling value from each subscriber station is one of multiple possible signaling values, each possible signaling value being associated with a different set of at least one vector of modulation symbols to send by the subscriber station in the at least one tile.

36. The apparatus of claim 35, wherein for each subscriber station the at least one processor is configured to correlate the at least one vector of received symbols with each of multiple sets of at least one vector of modulation symbols usable by the subscriber station for the multiple possible signaling values, and to determine the signaling value sent by the subscriber station based on correlation results for the multiple sets of at least one vector of modulation symbols.

37. A method for wireless communication, comprising:
   obtaining at least one vector of received symbols from at least one tile;

processing the at least one vector of received symbols to determine a set of at least one vector of modulation symbols sent by each of multiple subscriber stations in the at least one tile; and determining a signaling value sent by each of the multiple subscriber stations based on the set of at least one vector of modulation symbols determined to have been sent by the subscriber station in the at least one tile.

38. The method of claim 37, wherein the obtaining at least one vector of received symbols comprises obtaining three vectors of received symbols from three tiles, wherein the processing the at least one vector of received symbols comprises processing the three vectors of received symbols to determine a set of three vectors of modulation symbols sent by each of the multiple subscriber stations in the three tiles, and wherein the determining a signaling value comprises determining the signaling value sent by each of the multiple subscriber stations based on the set of three vectors of modulation symbols determined to have been sent by the subscriber station in the three tiles.

39. The method of claim 38, wherein the processing the three vectors of received symbols comprises, for each subscriber station correlating the three vectors of received symbols with three vectors of modulation symbols usable by the subscriber station for acknowledgement (ACK) to obtain a first value, correlating the three vectors of received symbols with three vectors of modulation symbols usable by the subscriber station for negative acknowledgement (NAK) to obtain a second value, and determining whether an ACK or a NAK was sent by the subscriber station based on the first and second values.

40. The method of claim 37, wherein the processing the at least one vector of received symbols comprises, for each subscriber station correlating the at least one vector of received symbols with each of multiple sets of at least one vector of modulation symbols usable by the subscriber station for multiple possible signaling values, and determining the signaling value sent by the subscriber station based on correlation results for the multiple sets of at least one vector of modulation symbols.

* * * * *